US012579591B2

(12) United States Patent
Bailey et al.

(10) Patent No.: US 12,579,591 B2
(45) Date of Patent: Mar. 17, 2026

(54) ARTIFICIAL INTELLIGENCE FOR VEHICULAR DRIVE-THROUGH BASED EXCHANGES

(71) Applicant: International Business Machines Corporation, Armonk, NY (US)

(72) Inventors: Logan Bailey, Atlanta, GA (US); Zachary A. Silverstein, Georgetown, TX (US); Jeremy R. Fox, Georgetown, TX (US); Hamid Majdabadi, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 18/426,541

(22) Filed: Jan. 30, 2024

(65) Prior Publication Data

US 2025/0245761 A1 Jul. 31, 2025

(51) Int. Cl.
*G06Q 50/12* (2012.01)

(52) U.S. Cl.
CPC .................................... *G06Q 50/12* (2013.01)

(58) Field of Classification Search
CPC ...................................................... G06Q 50/12
See application file for complete search history.

(56) References Cited

U.S. PATENT DOCUMENTS

| | | | | |
|---|---|---|---|---|
| 8,751,293 | B2 | 6/2014 | Hall et al. | |
| 11,024,104 | B2 | 6/2021 | Gaddam et al. | |
| 11,049,198 | B1 * | 6/2021 | Momin | G06Q 50/12 |
| 11,132,740 | B2 * | 9/2021 | Buckholdt | G10L 15/26 |
| 11,200,575 | B2 | 12/2021 | Seo et al. | |
| 11,244,681 | B1 | 2/2022 | Siefken et al. | |
| 11,348,160 | B1 | 5/2022 | Shukla et al. | |
| 11,594,223 | B1 * | 2/2023 | Bernardini | G10L 21/0364 |

(Continued)

FOREIGN PATENT DOCUMENTS

WO WO-2022231622 A1 * 11/2022 ......... G06Q 30/0601

OTHER PUBLICATIONS

Wang, Luyang, et al. "Context-aware drive-thru recommendation service at fast food restaurants." arXiv preprint arXiv:2010.06197 (2020). (Year: 2020).*

(Continued)

*Primary Examiner* — Nathan A Mitchell
(74) *Attorney, Agent, or Firm* — CHIP LAW GROUP

(57) ABSTRACT

Mechanisms are provided for performing an artificial intelligence (AI) based drive-through transaction. A digital image capturing device, in response to a vehicle entering a drive-through, captures a digital image of the vehicle. A computer vision operation is executed on the digital image to analyze data patterns and identify an identity of individual(s) within the vehicle. User profile(s) are retrieved that correspond to the individual(s) within the vehicle. A customized menu of products and/or services is generated based on user profile information and one or more menu items are pre-selected from the customized menu based on contextual information derived from at least one of audio or digital image data received during the drive-through transaction. A menu presentation computing device, located in the drive-through, is controlled to present the pre-selected menu item(s) and the customized menu.

20 Claims, 4 Drawing Sheets

(56) References Cited

U.S. PATENT DOCUMENTS

| | | | | |
|---|---|---|---|---|
| 2002/0143623 | A1* | 10/2002 | Dayley | G06Q 30/0269 705/14.27 |
| 2004/0214597 | A1* | 10/2004 | Suryanarayana | G06Q 20/3674 455/552.1 |
| 2012/0287281 | A1* | 11/2012 | Williams | G06Q 30/02 348/148 |
| 2013/0024299 | A1 | 1/2013 | Wong et al. | |
| 2013/0243260 | A1* | 9/2013 | Burry | G06V 40/16 382/105 |
| 2015/0254789 | A1* | 9/2015 | Neeld | G06Q 20/3278 705/15 |
| 2019/0108566 | A1 | 4/2019 | Coleman et al. | |
| 2020/0143422 | A1* | 5/2020 | Goto | G06V 40/10 |
| 2020/0202462 | A1* | 6/2020 | Muyskens | G06V 20/52 |
| 2022/0036898 | A1* | 2/2022 | Siefken | G06V 20/00 |
| 2022/0165262 | A1* | 5/2022 | Sumpter | G06Q 10/0631 |
| 2022/0292595 | A1 | 9/2022 | Li | |
| 2023/0230590 | A1* | 7/2023 | Sumpter | G06Q 30/0621 704/275 |
| 2024/0046689 | A1* | 2/2024 | Ali | G06F 3/0629 |
| 2024/0119400 | A1* | 4/2024 | Schwenker | G06V 20/625 |

OTHER PUBLICATIONS

"Joint Statement from McDonald's and IBM", International Business Machines Corporation, Oct. 27, 2021, 2 pages.

"Transformative automotive IT solutions", International Business Machines Corporation, accessed online Jan. 29, 2024, 8 pages.

Kunert, Paul, "IBM adds side order of NLP to McDonald's AI drive-thru chatbots", The Register, May 30, 2022, 2 pages.

Lucas, Amelia, "McDonald's is testing automated drive-thru ordering at 10 Chicago restaurants", CNBC, Tech to Table, Jun. 2, 2021, 7 pages.

Quach, Katyanna, "Do you want fr-AI-s with that appy-meal? McDonald's gobbles machine-learning biz for human-free Drive Thrus", The Register, Sep. 11, 2019, 2 pages.

Sharwood, Simon, "Big Blue scoffs a Happy Meal: McDonald's sells automated order-taking tech to IBM", The Register, Oct. 27, 2021, 2 pages.

Automotive Industry Technology Solutions, Retrieved from: https://web.archive.org/web/20250702060755/https://www.ibm.com/industries/automotive, Jul. 2, 2025 4 pages.

IBM IoT Connected Vehicle Insights, Retrieved from: https://web.archive.org/web/20201128110143/https://www.ibm.com/products/iot-for-automotive, Nov. 28, 2020, 6 pages.

Joint Statement from McDonald's and IBM, Retrieved from: https://newsroom.ibm.com/Joint-Statement-from-McDonalds-and-IBM, Oct. 27, 2021, 2 pages.

McDonald's, https://web.archive.org/web/20190219005513/https://www.ibm.com/case-studies/mcdonalds-watson-advertising, Feb. 19, 2019, 2 pages.

* cited by examiner

ARTIFICIAL INTELLIGENCE FOR VEHICULAR DRIVE-THROUGH BASED EXCHANGES

BACKGROUND

The present application relates generally to an improved data processing apparatus and method and more specifically to an improved computing tool and improved computing tool operations/functionality for implementing artificial intelligence to assist with vehicular drive-through based exchanges.

Artificial Intelligence (AI) computer models have been developed for various applications. As these AI computer models have been developed over time, there is now a large range of AI computer models that organizations and users can use to process input data and generate results. This range of AI computer models ranges from relative non-complex AI models such as rules based engines, to moderately complex AI models such as shallow classifiers, convolutional neural networks (CNNs), and the like, to high complexity AI models, such as deep learning neural networks (DNNs), large language models (LLMs), and the like, which are trained on massive amounts of data to perform highly complex operations handling large diversities in input data.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for performing an artificial intelligence (AI) based drive-through transaction. The method comprises automatically capturing, by a digital image capturing device in response to a vehicle entering a drive-through of an establishment, at least one digital image of the vehicle. The method further comprises automatically executing, in response to capturing the at least one digital image, a computer vision operation on the at least one digital image to analyze data patterns in the at least one digital image and identify an identity of at least one individual within the vehicle based on results of the analysis of the data patterns. In addition, the method comprises automatically retrieving, in response to identifying the at least one individual, at least one user profile, from a user profile registry, corresponding to the determined at least one identity of the at least one individual within the vehicle. Moreover, the method comprises automatically generating a customized menu of at least one of products or services based on user profile information stored in the at least one user profile and automatically pre-selecting one or more menu items from the customized menu based on contextual information derived from at least one of audio or digital image data received during the drive-through transaction. The method further comprises controlling a menu presentation computing device located in the drive-through to present the pre-selected one or more menu items and the customized menu to the at least one individual.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
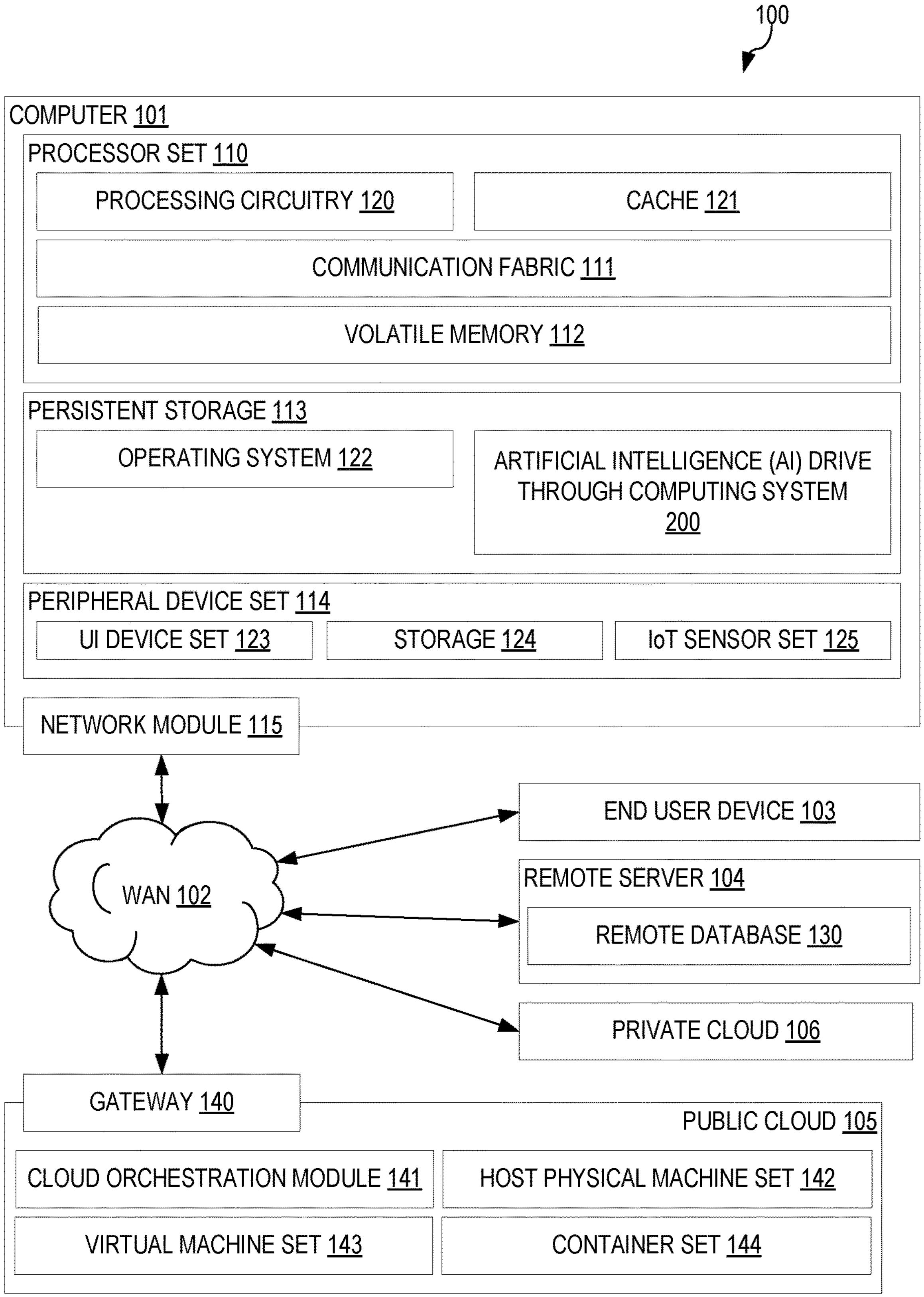
FIG. 1 is an example diagram of a distributed data processing system environment in which aspects of the illustrative embodiments may be implemented and at least some of the computer code involved in performing the inventive methods may be executed.

The illustrative embodiments provide an improved computing tool and improved computing tool operations/functionality for implementing artificial intelligence to assist with vehicular drive through based transactions. The illustrative embodiments provide an automated AI based experience for automatically identifying the vehicle and/or customer, and optionally the other occupants of the vehicle, and correlating the automatic identification with a customer profile. The automatic identification further permits the retrieval of transaction histories, preferences, and other contextual information for past transactions that may be used to predict, through artificial intelligence computer models, the goods/services that the customer and/or occupants of the vehicle, may be most interested in for the current transaction. The illustrative embodiments then provide this customized listing, or accelerated menu, to the customer for use in placing an order and conducting the transaction. In some cases, this may involve redirecting of the customers vehicle to particular lanes of the drive through to facilitate quicker service and/or specialized services. In some cases, this customized listing may not only be based on the customer, but which occupants are present in the vehicle with the customer, e.g., the customer's children, friends, spouse, or the like. The illustrative embodiments use the current context information, e.g., day, time, occupants, etc., to make predictions based on the stored context information and ordered goods/services from previous transactions.

One of the most common types of commercial transactions is in a drive through. Drive throughs exist in many different types of commercial establishments including banks, pharmacies, coffee shops, etc., but are most often associated with fast food restaurants. The drive through, or drive thru, is a travel lane associated with an establishment, along which one may drive their vehicle and interact with representatives of the establishment to obtain goods or services from that establishment. The drive through may have human beings working the drive through with which the driver may interact to obtain these goods or services, may have equipment for remotely interacting with such human workers, e.g., menu boards, speakers, microphones, etc., and a window or the like through which the driver is able to obtain the goods/services. Drive throughs allow customers to obtain goods and services from an establishment without requiring the customer to park and exit their vehicle.

The drive through is essentially a queuing mechanism used to cue customers in a line of vehicles. As a queue, a primary issue with drive throughs is the speed at which customers are able to get their goods/services. This speed affects not only the satisfaction of the customer, but also the profitability of the establishment. That is, if an establishment is able to handle more customers through an increased speed of servicing the customers, then more sales are made and profits increase.

It has been recognized that artificial intelligence (AI) and automation may be adapted to assist with these drive through transactions. The AI and automation mechanisms can increase the speed at which customers are provided by making decisions and performing operations quicker than human beings using specific non-generic computer operations that, while achieving a similar result to human beings in that the customer is provided goods/services, does so in a different manner than human beings due to the inherent limitations in computer technology, i.e., computers do not have the intuition and instinctiveness of human beings and instead must operate on explicit data.

The improved computing tool and improved computing tool operations/functions of the illustrative embodiments provide an AI based computer system that intelligently improves execution of a vehicular based mobile transaction. Taking a fast food, coffee, or other commercial establishment that provides a consumable product, the illustrative embodiments provide an AI drive through computing system that improves the process of servicing customers through a drive through associated with that establishment. The illustrative embodiments use contextual audio and video content to derive and heighten the commercial vehicular transaction. The illustrative embodiments captures or estimates a number of individuals in a vehicle and offer an accelerated menu. The illustrative embodiments comprise AI logic that can recall customer profiles based on context (e.g., day, time, etc.) and an identifier of a vehicle or customer, e.g., a Quick Response (QR) Code, bar code, license plate, or the like, affixed to the vehicle, an identifier presented by the driver of the vehicle, or the like, to determine historical transaction information and preferences for the customer. The information from the customer profile may then be used to automatically determine what are the most likely goods/services the customer will want to order based on the context, preferences, and historical transaction information. The AI drive through computing system may then generate predictions which may be presented to the customer for selection, as well as generate a "friendly" persona of the AI drive through computing system, such as dynamically modifying automated interaction systems, e.g., synthetic voice communication system, menu presentation options, etc.

With the mechanisms of the illustrative embodiments, during a planning and requirements gathering stage of operation, as customers are registered with the AI drive through computing system, either dynamically as the customer is first using the drive through and AI drive through computing system, or through a remote registration process, e.g., through the establishment's app, website, or other registration system, the scope of the drive through experience that is to be provided by the establishment is defined. For example, if the AI drive through computing system does not recognize a vehicle or customer identifier, or there is no vehicle or customer identifier affixed to the vehicle or presented by the customer, then the planning and requirements operations may be initiated. These planning and requirements operations may automatically gather the information from the interaction with the customer, e.g., capturing an image of the QR code, bar code, license plate, etc., storing indicators of the day, time, goods/services ordered, special requests of the customer, payment option used, and any other information that can be used to characterize the transaction between the customer and the establishment.

In some illustrative embodiments, facial recognition mechanisms may be utilized to identify the occupants of the vehicle using digital image gathering equipment and facial recognition AI computing systems. Customers may opt in/out of such facial recognition during the initial registration process. In this way, the facial recognition mechanisms may determine who is in the vehicle and association that particular combination of individuals with the other information gathered, e.g., what was ordered, day, time, etc. In this way, through the planning and requirements operation, historical transaction data associated with the vehicle/customer identifier and the occupants of the vehicle may be stored and used as input to an AI computer model when engaging with the customer in subsequent transactions.

In some illustrative embodiments, the AI drive through computing system may utilize a natural language processing (NLP) computer system and voice interaction system, or artificial intelligence (AI) conversation system, with voice recognition technology to interact with a customer through synthetic or simulated voice prompts, receive the customer's voice responses and convert them to natural language text, and analyze the natural language text to determine various aspects of the drive through transaction. The NLP computing system may utilize machine learning algorithms, deep learning, recurrent neural networks, Long Short-Term Memory (LSTM) networks, or the like, to implement the NLP operations/functionality as well as the voice recognition mechanisms.

With regard to the identification of the customer and occupants of the vehicle, computer vision technologies may be employed for analyzing the video, and optionally the audio, content captured from the vehicle to identify the occupants of the vehicle. For example, as noted above, the computer vision technologies may include digital image capturing capability and analysis mechanisms for reading and recognizing an identifier associated with a customer's vehicle. For example, a QR code reader, bar code reader, license plate reader, or other identifier affixed to the vehicle may be used to identify the vehicle and the customer associated with that vehicle. In some cases, wireless transceiver technologies may be utilized, such as Radio Frequency Identifier (RFID) based mechanisms, wireless interrogation and response systems, and the like, may be used to identify the vehicle and correlate the vehicle with a customer.

The computer vision technologies may also include facial recognition mechanisms that can detect one or more human beings or animals within the vehicle and perform facial recognition on the human beings and animals to determine who is in the vehicle. The computer vision technologies operate on images and audio captured from the interaction with a customer in the customer's vehicle in the drive through and outputs who is in the vehicle, how many people/animals are in the vehicle, and can determine if each of these identified people/animals have been previously served before, i.e., whether they were recognized or unrecognized.

The illustrative embodiments further implement a customer profile recall engine that recalls customer profiles from a customer profile registry based on the identification performed by the computer vision technologies. The vehicle and customer identification may be used to identify a particular customer profile while the facial recognition may be used to identify the particular entry or entries in the customer profile that correspond to the particular combination of occupants in the vehicle, for example. That is, a customer may have different combinations of one or more other occupants in the vehicle over time, e.g., a spouse, a spouse and kids, a pet, a spouse and pet, a spouse, kids, and the pet, a friend, a group of friends, etc. Each of these different combinations may be stored as different entries within the customer's profile and historical transaction data may be stored with regard to each of these different combinations. Thus, by identifying the customer via the vehicle/customer identification mechanisms of the illustrative embodiments, and identifying the particular other occupants in the vehicle, a particular set of one or more entries may be identified as being relevant to the current transaction.

The AI order taking computer system of the illustrative embodiments, based on the identification of the customer and/or occupants, retrieves the customer profile entries for that particular combination of customer and/or occupants. This information from the customer profile entries, e.g., historical transaction data, preferences, and the like, is input along with other current context information, to an AI computer model, e.g., DNN, RNN, LSTM, or the like, which is trained, through machine learning processes, to evaluate the current context information relative to the historical transaction data and make predictions as to the goods/services that the customer and/or occupants will most likely want as part of the current transaction. The AI drive through computing system may present to the customer, a customized listing, or menu, of goods/services that the AI drive through computing system has determined are most probable to be the goods/services the customer/occupants will be interested in for the current transaction. Moreover, customized settings of the output of the menu may be identified from the customer profile and used to customize the output and interaction with the customer, e.g., different size fonts, different colors, different synthesized voice genders, accents, and the like, etc.

The AI drive through computing system output may be interacted with by the customer, such as via touch-based interaction, voice-based interaction, or the like. The output may provide options through which the customer may provide inputs to specify whether or not the customer and/or occupants wish to select certain ones of the predicted goods/services, as well as provide options through which the customer can access the expanded listing or menu of goods/services. In addition, options may be presented for customizing the goods/services to the particular preferences of the customer/occupant, such as adding or removing components of the good/service, e.g., "no tomato", "add bacon", etc.

The AI drive through computing system, through the interaction with the output, obtains the customer/occupant selection and/or customization of goods/services for this current transaction. This information may be stored as historical transaction data in association with the particular entries for the customer and/or occupants in the customer profile. The customer profile may store a predetermined amount of historical transaction information such that older transaction information may be discarded if needed in order to allow more current transaction information to be stored. Thus, the current transaction information may be used in subsequent drive through transactions to provide more up-to-date recommendations or predictions of goods/services for the customer and/or occupants.

The AI drive through computing system further integrates with existing payment systems and menu management systems of the establishment. The payment systems and menu management systems may include such known technologies as Google Wallet, ApplePay, Stipe, PayPal, Square, Venmo, Oracle MiCros, Squirrel Systems, AmazingMenu, or any other known or later developed payment processing and menu management systems.

It should be appreciated that the transactions and interactions between the customer and the AI drive through computing system, payment system, menu management system, computer vision computing system, and the like may be maintained secure through implementation of existing security measures. These security measures protect the customer information and prevent fraud as well. These mechanisms may utilize secure authentication and access control protocols as well as identity and access management (IAM) systems or the like.

The AI drive through computing system may be deployed to a cloud-based infrastructure for various types of drive through establishments and maintained over time. The AI drive through computing system may be implemented as instances of the system for different types of establishments, or even different providers of goods/services. For example, a first AI drive through computing system may be configured and deployed for a first coffee store, a second AI drive through computing system for a first fast food restaurant, a third AI drive through computing system for a second coffee store chain, a fourth AI drive through computing system for a bank, a fifth AI drive through computing system for a second fast food restaurant chain, etc. The AI ordering system instances may be hosted by cloud provider hosting services and may be accessible by multiple different locations of a provider. In other illustrative embodiments, the AI drive through computing system may be implemented locally in the computing systems of the local establishment rather than using a centralized or cloud based system.

In some illustrative embodiments, the AI drive through computing system may further include integrate with equipment for directing the vehicle to different lanes of the drive through based on the identification of the vehicle and customer. For example, in cases where the vehicle and customer are recognized by the computer vision mechanisms, locally present indicators, voice output, or the like, may direct the customer to drive the vehicle along one of a plurality of possible drive through lanes. For example, for users that adopt the AI drive through computing system functionality, these users may be redirected to faster drive through lanes that use the automated mechanisms of the illustrative embodiments while other users are directed to different drive through lanes that require more traditional manual intervention.

In some illustrative embodiments, the AI drive through computing system routing component may also route users to different drive through lanes based on their particular orders. For example, if a vehicle/customer is identified and determined to have already submitted a catering order or is a pickup of a mobile order, the AI drive through computing system may automatically direct the customer to drive their vehicle to a designated drive through lane to provide improved assistance and experience for the customer, which in turn frees up the other drive through lanes for other customers.

Thus, the illustrative embodiments utilize a combination of machine learning algorithms, IT concepts, computer vision, and the like to improve the efficiency and user experience of commercial transactions conducted within drive throughs with customers and/or occupants of vehicles. The experiences could be strengthened through both positive and negative feedback from the customers with each and every experience. Automatically determining and utilizing the identity of the customer and/or any occupants of the vehicle through the mechanisms of the illustrative embodiment speeds up the processing to ensure that the fastest and highest quality experience is delivered to each customer, or group of occupants, as they progress through the drive through process. It should be appreciated that the AI drive through computing system operates automatically and autonomously to interact with customers such that the AI drive through computing system operations/functionality is executed without human intervention other than to receive customer inputs for selection of goods/services and interact with the AI drive through computing system output.

To further illustrate the operation of the AI drive through computing system, consider the following scenarios that are illustrative of the interaction between a customer that is an occupant of a vehicle in a drive through and the AI drive through computing system of the illustrative embodiments. In a first case, assume that a first customer, Hank, is a busy software engineer who frequently visits fast food restaurants for lunch. He values his time and prefers efficient, seamless experiences. Hank is driving through Austin, Texas, and stops at a popular fast-food restaurant for lunch. He orders his usual meal but realizes he left his wallet at home. He is hesitant to go back home, as it would take up too much time, and he is already running late for a meeting. Hank uses the AI drive through computing system of the illustrative embodiments, which recognizes his vehicle and offers a customized menu of items based on an analysis of Hank's historical transactions and the current context. This customized menu is also referred to as an "accelerated menu" as it accelerates the experience of the drive through.

The AI drive through computing system recalls his profile information and applies contextual analysis to derive that he has forgotten his wallet at home. The AI drive through computing system then prompts him to use the integrated payment system, which uses license plate and phone recognition to verify his identity and process the payment. With the illustrative embodiments, Hank can quickly and easily complete his transaction (which the system already predicted for ordering items) and without having to go back home for his wallet too. He gets what he wanted, faster than normal, and with minimum friction.

In a second case, assume that another customer, Jessica, is a busy mother of three in Florida who frequently visits coffee shops to grab a quick breakfast on the go. She prefers to use her mobile device to order and pay, but often struggles with the small screen size and limited keyboard functionality. The AI drive through computing system recognizes Jessica's vehicle and offers an accelerated menu based on her previous orders and preferences. Then, the AI drive through computing system utilizes natural language processing (NLP) to interpret her voice commands with authentication infusion (through her phone or drive-up microphone) and facilitates a seamless ordering and payment process through the integrated mobile application. The system also uses contextual analysis to suggest additional items based on her previous purchases while her 3 kids are in the vehicle with her, which she can easily select and add to her order with a few taps on her touchscreen device, all the kids in the vehicle already have their "known" favorite items added (for herself and all 3 kids) into the prompted ordering menu. She can always modify it with tapping, voice, or contextual updates for extra people in the vehicle that day.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides an artificial intelligence based order taking computer system. The improved computing tool implements mechanism and functionality, such as vehicle/customer and/or occupant identification, recalling customer profiles, generating predicted or recommended goods/services, and interacting with the customer through automated computer interaction, including natural language processing and synthetic voice generation, which cannot be practically performed by human beings either outside of, or with the assistance of, a technical environment, such as a mental process or the like. The improved computing tool provides a practical application of the methodology at least in that the improved computing tool is able to improve the drive through process at an establishment by making the drive through experience substantially automated and quicker with specific customization of the experience to the particular learned ordering of the particular customer and occupants of the vehicle.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as artificial intelligence (AI) drive through computing system 200. In addition to AI drive through computing system 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and AI drive through computing system 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in AI drive through computing system 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in AI drive through computing system 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement an AI drive through computing system. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates automated and intelligent drive through interactions with customers and occupants of vehicles without human intervention which improves customer experiences and increases the speed by which transactions are performed in drive through lanes of establishments.

Figure 2:
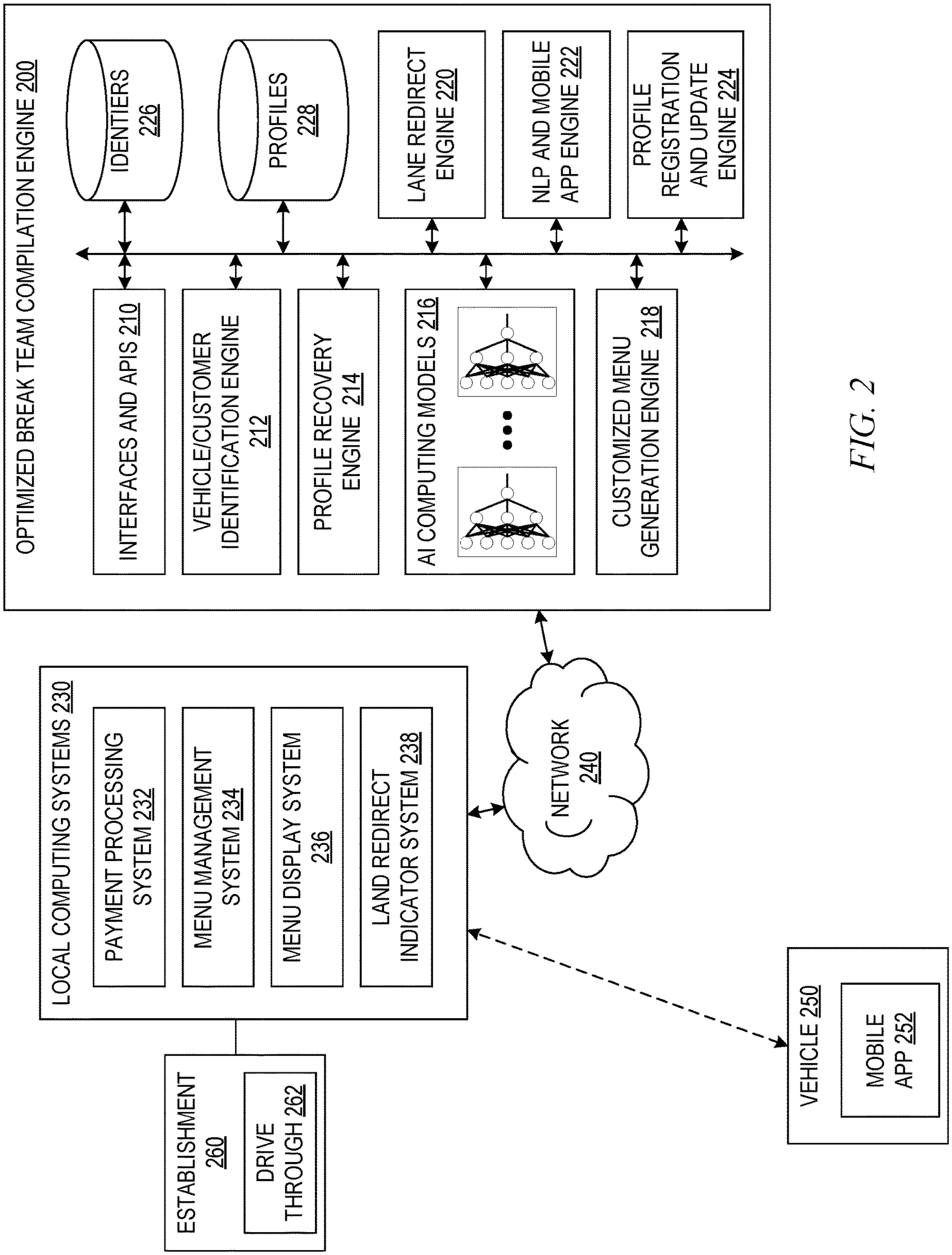
FIG. 2 is an example block diagram illustrating the primary operational components of an AI drive through computing system in accordance with one illustrative embodiment.

FIG. 2 is an example block diagram illustrating the primary operational components of an AI drive through computing system in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., search queries, and the resulting output may aid human beings. The invention is specifically directed to the automatically operating computer components directed to improving the way that drive through transactions are performed, and providing a specific solution that implements artificial intelligence computer models, computer vision, customer profile recall, natural language processing, and the like, which cannot be practically performed by human beings as a mental process and is not directed to organizing any human activity.

As shown in FIG. 2, the artificial intelligence (AI) drive through computing system 200 comprises interfaces and APIs 210 which comprise computer logic for performing data communication with local computing systems 230 at an establishment via one or more wired and/or wireless data networks 240. The interfaces and APIs 210 may comprise not only standard data network communication protocols and encryption/security mechanisms, but may also comprise specific computer logic configured to operate with specific local systems 230 of a particular establishment for which the AI drive through computing system 200 is configured. As can be appreciated, different establishments may have different system configurations, data structures that are utilized, and requirements for performing different operations with regard to gathering and communicating data between the local systems and the AI drive through computing system 200, and these customizations may be provided through specifically configured computer logic of the interfaces and APIs 210.

The interfaces and APIs 210 may operate with local systems 230 associated with the establishment 260 to communicate data and messages between the local systems 230 and the AI drive through computing system 200. For example, the interfaces and APIs 210 may operate to obtain and pre-process image data captured at the local systems 230, receive voice data and/or textual representations of voice data, from interactions with the customer in their vehicle, provide messages back to the systems 230 to control their operations by indicating what menu goods/services to display in a customize menu output, provide content to be spoken to the customer via synthesized voice communication, control messages to control local lane direction indicators, and the like. Any communications of data and/or messages for relaying information and/or commands may be processed via the interfaces and APIs 210 when communicating between the local systems 230 and the AI drive through computing system 200.

The AI drive through computing system 200 further includes a vehicle/customer identification engine 212 which comprises computer logic for identifying the vehicle from vehicle affixed identifiers, e.g., QR codes, bar codes, license plates, etc., as well as customers and occupants of the vehicle from captured images of the customers and occupants. The vehicle/customer identification engine 212 may access a database 226 of registered vehicle/customer identifiers of previously registered and/or previously encountered vehicles/customers. It should be appreciated that the identity of the customer need not be provided in all cases. For example, a customer may drive through the drive through lanes of the establishment, and if no existing entry for the vehicle is present in the identifier database 226, then a new entry may be created for the vehicle based on the vehicle identifier, e.g., the license plate. The vehicle/customer identification engine 212, recognizing that no existing identifier is present in the identifier database 226 for the vehicle, sends a response message back to the local systems instructing the system to invite the driver of the vehicle to register as a customer by providing some customer specific information, e.g., name and contact information, if the customer so desires, as well as preferences for future drive through experiences. This registration invitation may be presented, for example, as a QR code or the like that the customer can scan with their mobile device, e.g., camera of their smart phone, which will take them to a website, app, or the like, where they can complete their registration, at a time of their convenience, and have it associated with the vehicle identifier that was already captured and stored in the identifier database 226. If a customer does not wish to register, the AI drive through computing system can still offer accelerated menus and improved experiences based only on the vehicle identifier, although some customizations specific to the customer may not be able to be implemented in some cases.

The profile recovery engine 214 comprises computer logic to take the identifications from the vehicle/customer identification engine 212 and recover the entries corresponding to the particular vehicle/customer identification from the profile database 228. The profile database 228 stores the customer profiles that correspond to identifiers in the identifier database 226. The customer profiles may specify the vehicle/customer identifier and corresponding preferences, transaction histories with regard to goods/services ordered, information about occupants of the vehicle during previous transactions, payment options, etc. The customer profiles may have multiple entries for different configurations of customer and other occupants of the vehicle. In some cases the other occupants may be specifically identified from facial recognition. In other cases, the other occupants may be specified in terms of general characteristics including number of occupants, whether the occupant is an adult, child, or animal, and whether the occupant is male or female. This information allows for AI based prediction of which goods/services the customer will likely be interested in given the occupants of the vehicle without having to specifically identify each individual occupant of the vehicle.

The AI drive through computing system 200 further comprises one or more AI computer models 216, e.g., deep neural networks (DNN), Long Short Term Memory (LSTM) models, convolutional neural networks (CNNs), Random Forest, or the like, which are trained through machine learning operations to perform various classification and prediction operations to facilitate the AI operations of the AI drive through computing system 200. For example, some of the AI computer models may operate to perform facial recognition based on images captured from vehicles and occupants traveling along the drive through 262 at the local establishment 260 to facilitate the vehicle/customer identification and to identify other occupants of the vehicle. Some AI computer models 216 may operate to classify the customer and other occupants as to various classes, such as male, female, adult, child, animal, etc. based on characteristics of the individuals capture from images of the customer and occupants captured at the drive through 262 of the establishment 260.

Some AI computer models 216 are specifically trained to receive the customer profile information and current context information, e.g., day, time, etc., and generate a prediction of the goods/services offered by the establishment 260 that the customer is likely to be interested in. Such AI computer models 216 are trained through machine learning processes on training data which may comprise customer/occupant information, corresponding historical transaction information, and context information, e.g., day, time, etc. and ground truth data specifying one or more goods/services that the establishment 260 provides that the customer/occupants are interested in obtaining. Through an iterative machine learning operation of processing the training data inputs, generating predictions, comparing the predictions to the ground truth to determine an error or loss, and then adjusting operational parameters of the AI computer model 216 to reduce the error/loss, e.g., modifying weights of nodes in the AI computer model 216, the AI computer model 216 is trained to make better predictions until the error/loss is equal to or below a threshold error/loss or a predetermined number of iterations, or epochs, have occurred. Once trained, the AI computer model 216 may then be used to process new input data and generate corresponding predictions of goods/services.

It should be appreciated that the AI computer model 216 may not predict only one good/service but may generate probability values for each of the goods/services offered by the establishment 216 given the input data, and those goods/services having probability values greater than a predetermined threshold may be returned as predicted goods/services that the customer may be interested in. In some cases, if the number of goods/services does not correspond to a minimum number of goods/services for the number of occupants of the vehicle, the probability value threshold may be dynamically, and temporarily, reduced to allow for more goods/services to be selected based on their probability values. Alternatively, the top X number of goods/services may be selected based on their probability values, where X may be configured to the particular preferences of the establishment 260.

The customized menu generation engine 218 takes the predictions of the AI computer model 216 and the preferences from the customer profile for presentation of the menu, and generates a customized menu of goods/services for the customer. This information is sent to the local systems 230 to control the presentation of a customized menu to the customer via a menu display 236. That is, the customized menu generation engine 218 may transmit data specifying the particular menu items, e.g., goods/services, that are to be displayed as well as the way in which those items are to be displayed based on the customer preferences. This information is relayed to the local systems 230 via the interfaces and APIs 210 and network 240. The local systems 230 comprise a menu system 234 which receives this information and identifies content to be displayed corresponding to the identifiers of the menu items to be displayed, e.g., images, text, and the like, and generates the menu output for outputting on the menu display 236. The menu output controls the menu display 236 to display the content using the particular fonts, colors, font size, etc., specified in the customer profile. Moreover, in cases where voice communication is utilized, the menu output may also specify characteristics of synthesized voice outputs provided, e.g., gender, accent, etc.

In addition, in some illustrative embodiments where the local systems 230 include an automated voice response unit (VRU) or other synthesized voice interaction system, voice communications facilitated through speaker/microphone of the menu display 236 may be used to conduct a conversation with the customer which may be subjected to local NLP processing and/or NLP engine 222 of the AI drive through computing system 200 to understand the customer's natural language spoken input and respond accordingly. This may include converting voice to text and text to voice to facilitate such communications, e.g., receiving voice input, converting it to text, analyzing the text using NLP to determine the focus and other aspects of the communication, generating a response to the input based on the determined aspects, converting the response from text to voice, and outputting the synthesized voice response.

The AI drive through computing system 200 further includes, in some illustrative embodiments, a lane redirection engine 220. The lane redirection engine 220 determines whether a vehicle/customer is identified and is to be provided a customized menu. If so, the lane redirection engine 220 may redirect the customer to drive their vehicle along a particular drive through pathway that provides accelerated service and a customized experience. For example, if the vehicle/customer identification engine 212 identifies the vehicle/customer as being previously registered by finding the corresponding vehicle/customer identifier in the identifier database 226, then the lane redirection engine 220 may be invoked to send a command to the lane direction indicator 238 of the local systems 230 to redirect the vehicle to a different drive through lane. In some cases, the lane redirection engine 220 may also determine whether the vehicle/customer has a pending order that was previously made, e.g., through a mobile app to pre-order a menu item, a catering order, or any other special circumstances that would warrant customized or specializing service provided to the customer. In such cases, the lane redirection engine 220 may interface with the local systems 230 to obtain pending order information and catering order information to determine if there is a match between the vehicle/customer identifier and identifiers associated with pending orders or catering orders and if a match is identified, initiate redirection of the vehicle to a lane for specialized or customized service.

In some illustrative embodiments, as mentioned previously, the AI drive through computing system 200 may include NLP and mobile application engine 222 which provides computer logic for performing natural language processing of voice inputs from customers via the speaker/microphone integrated into the menu display 236. In addition, the NLP and mobile application engine 222 may provide computing logic for communicating with a mobile application 252 of a customer of the vehicle 250, where this mobile application is associated with the establishment 260. The mobile application allows the customized menu to be presented to the customer using their mobile device, assuming the customer has provided permissions to push such customized menus to the mobile device, through which the customer may select items from the customized menu for ordering. This will allow the customer to use an interface that they may be more comfortable with and may allow the customer to pass the mobile device to occupants of the vehicle so that they may likewise select menu items for order. In addition, the customer may have previously registered payment options that may be invoked via the mobile application 252 and may utilize them through the mobile application 252 to pay for the current order by interfacing with the local payment system 232.

It should be appreciated that while the drive through transaction is taking place, i.e., the customer drives the vehicle to the drive through, the vehicle/customer/occupants are identified, the customized menu is generated and presented to the customer, the customer selects menu items for ordering, and the customer pays for the selected menu items and receives the menu items, information about this transaction is maintained and tracked for updating of the entries associated with the vehicle/customer in the profiles database 228. That is, the profile registration and update engine 224 comprises computer logic for registering new customers as well as updating existing customer profiles in the profiles database 228. This may include adding new entries to the profile associated with the customer, where the entries may be keyed to the number and types of occupants in the vehicle, context information such as day, time, etc., and may specify the particular menu items selected as well as any other indicators of preferences of the customer for the transaction, e.g., payment option utilized. This information is stored in the profiles database 228 for use in subsequent transactions when the customer again drives their vehicle to the drive through 262 of the establishment 260.

Thus, the improved computing tool and improved computing tool operations/functions of the illustrative embodiments provide an AI based computer system that intelligently improves execution of a vehicular based mobile transaction. The illustrative embodiments use contextual audio and video content to derive and heighten the commercial vehicular transaction. The illustrative embodiments capture or estimate a number of individuals in a vehicle and offer an accelerated menu based on the number of individuals, the identity of the vehicle/customer, the context of the transaction, and the like, through specially trained predictive AI computer models. The generated predictions of which menu items the customer and occupants of the vehicle are most likely interested in may be used to drive a presentation of a customized menu to the customer for selection and ordering, as well as generate a “friendly” persona of the AI drive through computing system, such as dynamically modifying automated interaction systems, e.g., synthetic voice communication system, menu presentation options, etc.

As discussed above, with the mechanisms of the illustrative embodiments, during a planning and requirements gathering stage of operation, as customers are registered with the AI drive through computing system 200, either dynamically as the customer is first using the drive through and AI drive through computing system 200, or through a remote registration process, e.g., through the establishment’s app, website, or other registration system, the scope of the drive through experience that is to be provided by the establishment is defined. For example, if the AI drive through computing system 200 does not recognize a vehicle or customer identifier, or there is no vehicle or customer identifier affixed to the vehicle or presented by the customer, then the planning and requirements operations may be initiated and the operation of the profile registration and update engine 224 may be invoked to perform the registration process. These planning and requirements operations may automatically gather the information from the interaction with the customer, e.g., capturing an image of the QR code, bar code, license plate, etc., storing indicators of the day, time, goods/services ordered, special requests of the customer, payment option used, and any other information that can be used to characterize the transaction between the customer and the establishment.

In some illustrative embodiments, facial recognition mechanisms may be utilized at the local systems 230 and/or the AI computer models 216 to identify the customer and/or occupants of the vehicle 250 using digital image gathering equipment and facial recognition AI computing systems that may be implemented locally or as an AI computer model 216. The facial recognition mechanisms may determine who is in the vehicle and association that identification of particular combination of individuals with the other information gathered, e.g., what was ordered, day, time, etc. In this way, through the planning and requirements operation, historical transaction data associated with the vehicle/customer identifier and the occupants of the vehicle may be stored in the profile associated with the vehicle identifier/customer identifier and the particular configuration of occupants of the vehicle in entries of the profile database 228. These entries may then be used as input to an AI computer model 216 when engaging with the customer in subsequent transactions.

In some illustrative embodiments, the AI drive through computing system 200 may utilize a natural language processing (NLP) computer system and voice interaction system with voice recognition technology, to interact with a customer through synthetic or simulated voice prompts, receive the customer’s voice responses and convert them to natural language text, and analyze the natural language text to determine various aspects of the drive through transaction. The NLP computing system, e.g., NLP and mobile application engine 222, may utilize machine learning algorithms, deep learning, recurrent neural networks, Long Short-Term Memory (LSTM) networks, or the like, to implement the NLP operations/functionality as well as the voice recognition mechanisms.

With regard to the identification of the customer and occupants of the vehicle, computer vision technologies may be employed for analyzing the video, and optionally the audio, content captured from the vehicle 250 by the local systems 230 to identify the occupants of the vehicle 250. For example, as noted above, the computer vision technologies may include digital image capturing capability and analysis mechanisms for reading and recognizing an identifier associated with a customer’s vehicle. For example, a QR code reader, bar code reader, license plate reader, or other identifier affixed to the vehicle may be used to identify the vehicle and the customer associated with that vehicle. In some cases, wireless transceiver technologies may be utilized, such as Radio Frequency Identifier (RFID) based mechanisms, wireless interrogation and response systems, and the like, may be used to identify the vehicle 250 and correlate the vehicle 250 with a customer.

The computer vision technologies may also include facial recognition mechanisms that can detect one or more human beings or animals within the vehicle 250 and perform facial recognition on the human beings and animals to determine who is in the vehicle. The computer vision technologies operate on images and audio captured from the interaction with a customer in the customer's vehicle 250 in the drive through and outputs who is in the vehicle, how many people/animals are in the vehicle, and can determine if each of these identified people/animals have been previously served before, i.e., whether they were recognized or unrecognized via the vehicle/customer identification engine 212.

Customer profiles are recalled, by the profile recovery engine 214 from a customer profile registry or database 228 based on the identification performed by the computer vision technologies of the vehicle/customer identification engine 212. The vehicle and customer identification may be used to identify a particular customer profile while the identification of the configuration of occupants of the vehicle 250 may be used to identify the particular entry or entries in the customer profile that correspond to that particular combination of occupants. By identifying the customer via the vehicle/customer identification mechanisms of the illustrative embodiments, and identifying the particular other occupants in the vehicle, a particular set of one or more entries may be identified as being relevant to the current transaction.

The AI drive through computer system 200 of the illustrative embodiments, based on the identification of the customer and/or occupants, retrieves the customer profile entries for that particular combination of customer and/or occupants. This information from the customer profile entries, e.g., historical transaction data, preferences, and the like, is input along with other current context information, to an AI computer model 216, e.g., DNN, RNN, LSTM, or the like, which is trained, through machine learning processes, to evaluate the current context information relative to the historical transaction data and make predictions as to the goods/services that the customer and/or occupants will most likely want as part of the current transaction. The AI drive through computing system 200 may present to the customer, a customized listing, or menu, of goods/services that the AI drive through computing system 200 has determined are most probable to be the goods/services the customer/occupants will be interested in for the current transaction. Moreover, customized settings of the output of the menu may be identified from the customer profile and used to customize the output and interaction with the customer, e.g., different size fonts, different colors, different synthesized voice genders, accents, and the like, etc.

The AI drive through computing system 200 output may be interacted with by the customer, such as via touch-based interaction, voice-based interaction, or the like. In some cases, this interaction may be facilitated through a mobile application 252 provided on a mobile device associated with the customer. The output may provide options through which the customer may provide inputs to specify whether or not the customer and/or occupants wish to select certain ones of the predicted goods/services, as well as provide options through which the customer can access the expanded listing or menu of goods/services. In addition, options may be presented for customizing the goods/services to the particular preferences of the customer/occupant, such as adding or removing components of the good/service, e.g., "no tomato", "add bacon", etc.

The AI drive through computing system 200, through the interaction with the output, obtains the customer/occupant selection and/or customization of goods/services for this current transaction. This information may be stored, by the profile registration and update engine 224, as historical transaction data in association with the particular entries for the customer and/or occupants in the customer profile of the profile database 228. The customer profile may store a predetermined amount of historical transaction information such that older transaction information may be discarded or overwritten by the profile registration and update engine 224 if needed in order to allow more current transaction information to be stored. Thus, the current transaction information may be used in subsequent drive through transactions to provide more up-to-date recommendations or predictions of goods/services for the customer and/or occupants.

The AI drive through computing system 200 further integrates with existing payment systems 232 and menu management systems 234 of the establishment 260. The payment systems 232 and menu management systems 234 may include such known technologies as Google Wallet, ApplePay, Stipe, PayPal, Square, Venmo, Oracle MiCros, Squirrel Systems, AmazingMenu, or any other known or later developed payment processing and menu management systems.

It should be appreciated that the transactions and interactions between the customer and the AI drive through computing system 200, payment system 232, menu management system 234, computer vision mechanisms of the vehicle/customer identification engine 222, and the like may be maintained secure through implementation of existing security measures, such as encryption and authentication mechanisms, which may be facilitated through the logic of the interfaces and APIs 210. These security measures protect the customer information and prevent fraud as well. These mechanisms may utilize secure authentication and access control protocols as well as identity and access management (IAM) systems or the like.

The AI drive through computing system 200 may be deployed to a cloud-based infrastructure for various types of drive through establishments and maintained over time. The AI drive through computing system 200 may be implemented as instances of the system 200 for different types of establishments, or even different providers of goods/services. That is, the instance shown in FIG. 2 may be replicated for other establishments different from establishment 260. Moreover, multiple establishments 260 of the same provider or same type of establishment providing the same menu items may make use of the same instance of the system 200. The AI drive through computing system 200 instances may be hosted by cloud provider hosting services and may be accessible by multiple different locations of a provider.

In other illustrative embodiments, the AI drive through computing system 200 may be implemented locally in the computing systems of the local establishment 260 rather than using a centralized or cloud based system. That is, rather than being distributed as shown in FIG. 2, the mechanisms of the system 200 may be integrated with the local systems 230 at the local establishment 260 in some illustrative embodiments.

As noted above, the AI drive through computing system 200 control equipment, such as visual indicators, synthesized voice output directions, or the like, to redirect a vehicle driver to particular lanes of the drive through for accelerated or specialized service based on the identification of the vehicle and customer. For example, in cases where the vehicle and customer are recognized by the computer vision mechanisms of the vehicle/customer identification engine 212, locally present indicators, voice output, or the like, may direct the customer to drive the vehicle along one of a plurality of possible drive through lanes that is designated for handling special situations, such as customized menus, catering orders, pick-up of mobile orders, or the like. For example, for users that adopt the AI drive through computing system 200 functionality, these users may be redirected to faster drive through lanes that use the automated mechanisms of the illustrative embodiments while other users are directed to different drive through lanes that require more traditional manual intervention.

In some illustrative embodiments, the AI drive through computing system routing component may also route users to different drive through lanes based on their particular orders. For example, if a vehicle/customer is identified and determined to have already submitted a catering order or is a pickup of a mobile order, the AI drive through computing system may automatically direct the customer to drive their vehicle to a designated drive through lane to provide improved assistance and experience for the customer, which in turn frees up the other drive through lanes for other customers.

Thus, the illustrative embodiments utilize a combination of machine learning algorithms, IT concepts, computer vision, and the like to improve the efficiency and user experience of commercial transactions conducted within drive throughs with customers and/or occupants of vehicles. User feedback may be obtained, such as via the mobile application 252 or the like, from the customers with each and every experience to update the training of the AI computer models 216. For example, if a customer indicates that the AI drive through computing system 200 generated incorrect menu items, the operational parameters of the AI computer model may be modified to reduce this error.

Automatically determining and utilizing the identity of the customer and/or any occupants of the vehicle through the mechanisms of the illustrative embodiment speeds up the processing to ensure that the fastest and highest quality experience is delivered to each customer, or group of occupants, as they progress through the drive through process. Again, the AI drive through computing system 200 operates automatically and autonomously to interact with customers such that the AI drive through computing system 200 operations/functionality are executed without human intervention other than to receive customer inputs for selection of goods/services and interact with the AI drive through computing system 200 output.

Figure 3:
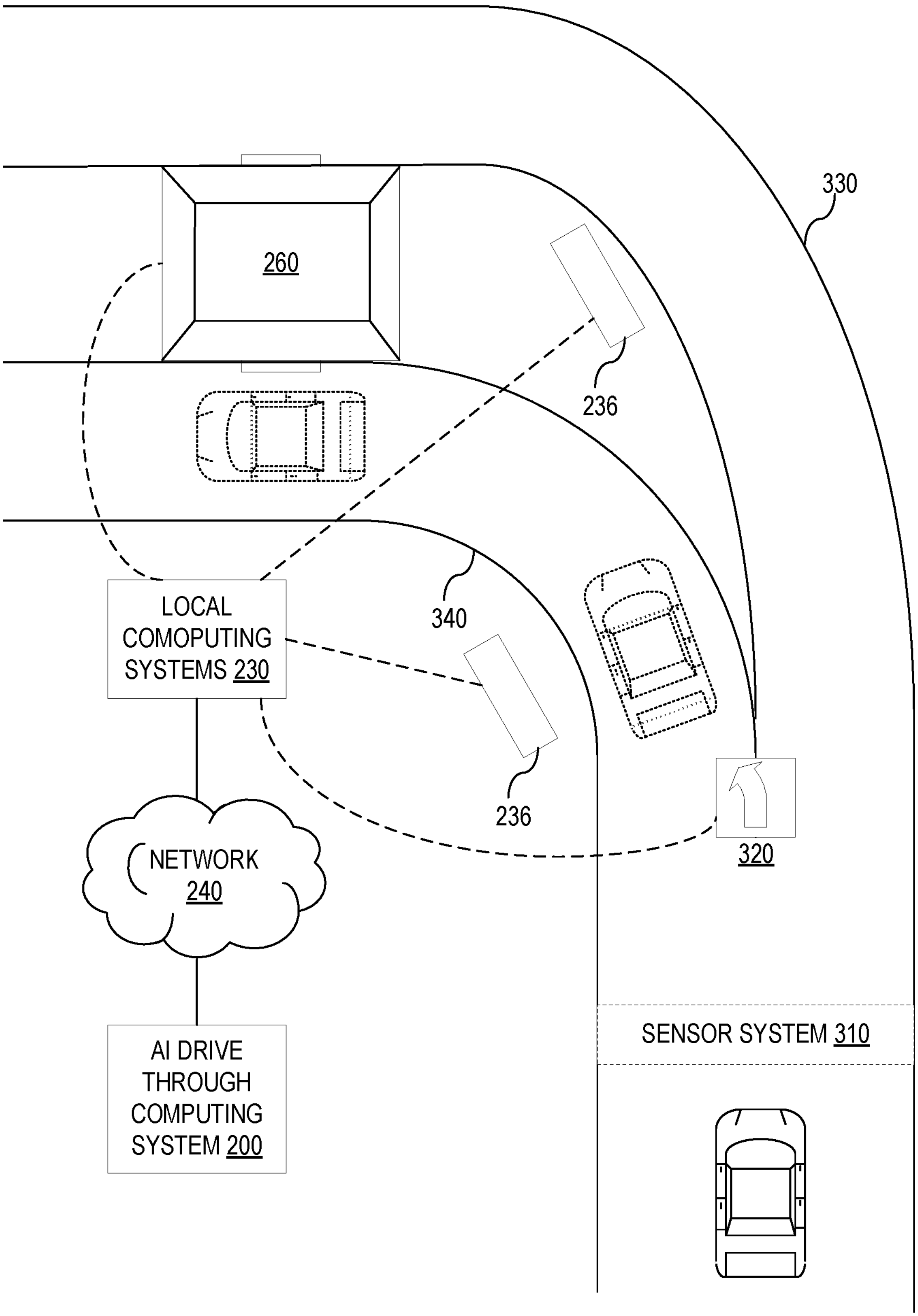
FIG. 3 is an example diagram of a drive through configuration in which the AI drive through computing system may be implemented, in accordance with one illustrative embodiment.

FIG. 3 is an example diagram of a drive through configuration in which the AI drive through computing system may be implemented, in accordance with one illustrative embodiment. In FIG. 3, similar components to that shown in FIG. 2 are given similar reference numerals for consistency. As shown in FIG. 3, a vehicle 250 may enter a drive through 262 of an establishment 260, where the drive through may have multiple lanes 330, 340 along which the vehicle may move. It is assumed for purposes of this illustration that the vehicle 250 has an affixed identifier, either as a license plate, a sticker having a code, e.g., bar code, QR code, or other identifier, or a transceiver system, such as an RFID device or the like, which may be detected by sensor system 310 at an upstream location of the drive through 262 prior to the vehicle reaching a menu display 236. The sensor system 310 may comprise one or more sensor devices for capturing images of the vehicle and occupants of the vehicle for vehicle/customer and other occupant identification. For example, one or more digital camera devices may be utilized to capture digital images of the vehicle in locations where vehicle identifiers are expected to be located, e.g., locations of the vehicle where a license plate, QR code/bar code sticker, or the like may be present. Similarly, cameras may be located to conveniently capture images of the occupants of the vehicle 250. In some cases, the sensors may include transceivers to transmit interrogation signals and receive responsive signals, such as in an RFID device, communicate with a mobile device of the customer or occupant of the vehicle, or the like. Any suitable sensor for capturing the vehicle and/or customer/occupant identification may be used without departing from the spirit and scope of the present invention.

The data gathered form the sensor system 310 is provided to the local computing systems 230 which may then communicate with the AI drive through system 200 of the illustrative embodiments to identify the vehicle/customer and/or the occupants of the vehicle 250 and either register the customer as a new customer or retrieve the customer profile for the identified customer taking into consideration the current context and the configuration of occupants in the vehicle. The retrieved customer profile is input along with the current context information and current occupant configuration to an AI computer model which then predicts which menu items the customer will most likely be interested in during the current transaction. These operations are performed while the customer is operating the vehicle 250 along the drive through 262. Cameras may be used to track the progress of the vehicle 250 along the drive through 262.

In response to the AI drive through system 200 identifying the vehicle/customer, the AI drive through system 200 may communicate with the local computing system 230 to determine if there are any pending orders, catering orders, mobile orders, or the like, that are associated with the vehicle/customer. If there are, or if the customer is an already registered customer, the AI drive through system 200 may instruct the local computing system 230 to control the lane redirect indicator 320 to redirect the vehicle 250 path of motion along an appropriate lane of the drive through 262. For example, for customers that are already registered to use the customized menu mechanisms of the illustrative embodiments, the vehicle 250 may be redirected along an AI drive through computer system enabled lane 340 of the drive through 262. For customers that have not previous registered, or who are otherwise determined to be ones that will require a more traditional and manual drive through process, the vehicle 250 may be routed along a different lane 330 by the lane redirect indicator 320 based on controls form the local computing systems 230. Moreover, for customers that have pending orders, mobile orders, or catering orders, the vehicle 250 may be directed along an appropriate lane by the lane redirect indicator 320 under the control the local computing system 230 based on the inputs from the AI drive through computing system 200.

It should be appreciated that while these operations may be the default operations, they may be overridden. For example, in times of backlog of one lane 340, 350 over the other, these default operations may be overridden such that the flow of vehicles may be distributed in a more balance manner dynamically as needed to increase the throughput of the drive through 262. Thus, the AI drive through system 200 may take into consideration not only the characteristics of the vehicle/customer and the pending orders, but also the volume of vehicles presently in each lane and the time in each lane needed to service the customers.

The predictions of menu items that the customer is likely to be interested in for the current transaction, as determined by the AI drive through computing system 200 may be used, along with customer preferences for representing the menu to the customer, to generate and output a customized menu via the menu display 236. As shown in FIG. 3, the local computing systems 230 drive and control the display of menus via the two menu displays 236, which may include speakers and microphones as well to conduct voice communication with the customer as the customer is in their vehicle 250. In the case of the regular lane 350, the menu display 236 may display a menu without customization. In the case of the AI enabled lane 340, the customized menu may be output on the menu display 236 where this customized menu comprises the predicted menu items of interest. The customized menu may further utilize the font, font size, colors, and other display and audio output settings set forth in the customer's profile, as previously discussed above. The customer may interact with the menu display 236 via voice communication which may be processed via NLP mechanisms, may select menu items from a touch-screen display, or even may use a mobile application on a mobile device associated with the customer to communicate between the local computing system 230 and the customer's mobile device, to thereby place an order for one or more menu items.

Once the transaction is complete at the establishment 260, e.g., payment has been processed and the selected menu items have been provided, or at a later time, such as end of day after all transactions for the day have been compiled into a data structure, the transaction details may be sent to the AI drive through computing system 200 for updating of customer profiles. The AI drive through computing system 200 generates new entries in the customer profiles specifying the transaction details including the context information, e.g., day, time, etc., menu items selected, occupants of the vehicle, etc.

It should be appreciated that the customized menu display is generated automatically without human intervention during the time the vehicle 250 moves from the entrance to the drive through to the location adjacent the menu display 236. Thus, by the time the vehicle 250 reaches the menu display 236, the menu display is already customized to the predicted menu items of interest and the customer's preferred settings. In this way, the customer is presented with a more customer friendly experience that allows the customer to make a quicker selection of the menu items that they are most interested in and obtain those menu items in an expedited manner. This increases the flow of the lanes 340 and 350 and increases the number of customers that the establishment 260 can services within a given time period.

Figure 4:
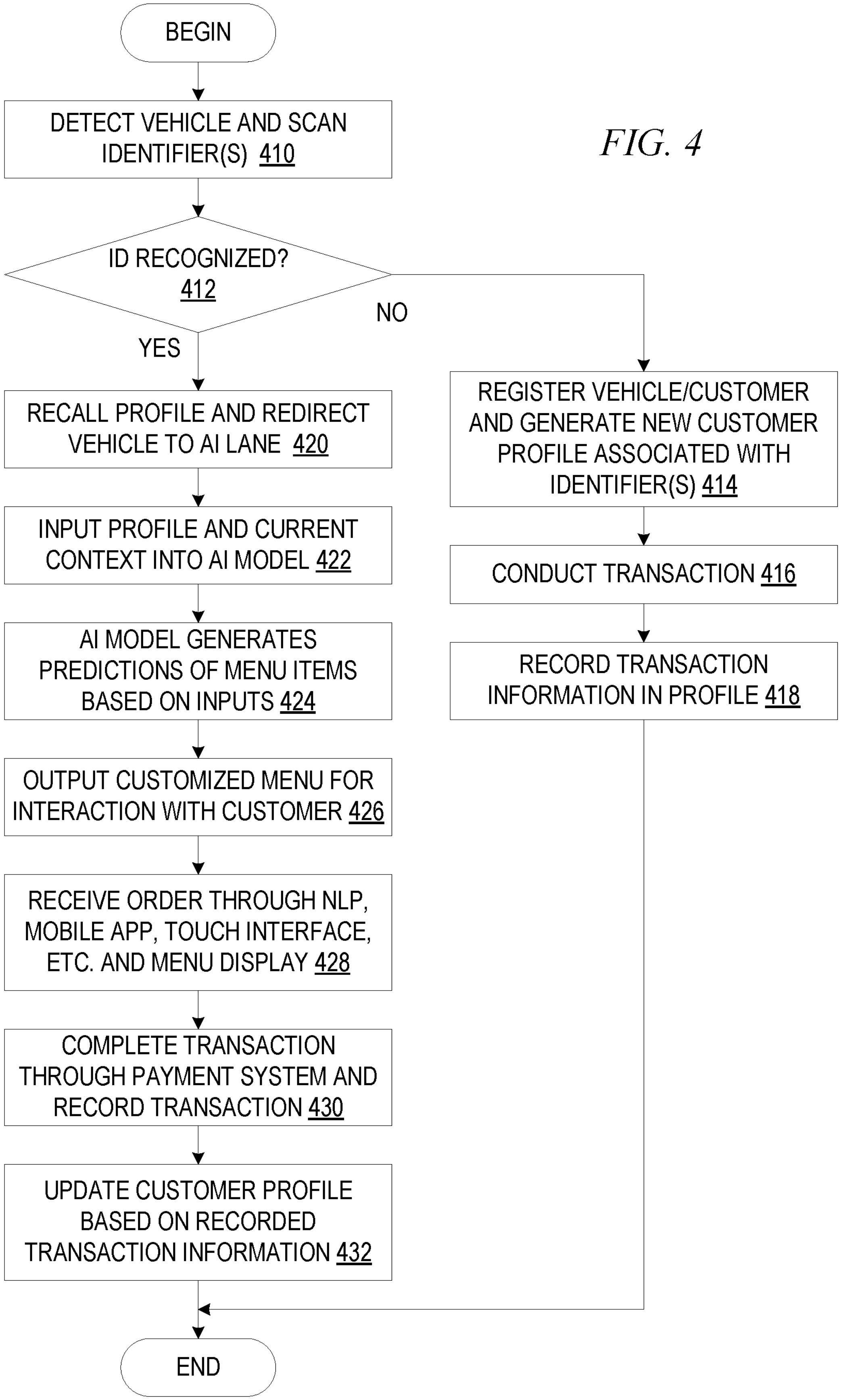
FIG. 4 presents a flowchart outlining example operations of an AI drive through computing system when processing a current drive through transaction in accordance with one or more illustrative embodiments.

FIG. 4 presents a flowchart outlining example operations of an AI drive through computing system when processing a current drive through transaction in accordance with one or more illustrative embodiments. It should be appreciated that the operations outlined in FIG. 4 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 4, and may, in some cases, make use of the results generated as a consequence of the operations set forth in FIG. 4, the operations in FIG. 4 themselves are specifically performed by the improved computing tool in an automated manner.

As shown in FIG. 4, the operation starts by detecting the presence of a vehicle in the entrance to the drive through and scanning for the vehicle and/or customer identifier as well as occupants of the vehicle (step 410). A determination is made as to whether the vehicle/customer identifier has been previously registered with the AI drive through computing system (step 412). If the vehicle/customer has not bene previously registered, then a registration operation in initiated to thereby register the vehicle/customer automatically or semi-automatically (step 414). This may involve automatically generating a profile for the vehicle/customer based on the detected identifier, e.g., license plate of the vehicle, and initiating an interaction with the customer to provide additional registration details. For example, the system may provide a QR code that may be scanned by the customer using a mobile device to initiate a session with a website, mobile app, or the like, to complete the registration process. The customer entered information may be recorded in association with the automatically captured information to update the customer's profile.

The customer may conduct the transaction with the establishment in a traditional manner using manual interactions (step 416). The transaction information for the current transaction may be recorded and provided to the AI drive through computing system to update the customer profile (step 418), such as context information, selected menu items, number and types of the occupants, and the like. In this way, the vehicle/customer is registered and an initial entry for the vehicle/customer profile may be generated using the automatically captured information for the current transaction, as well as any customer input to complete the registration process.

If the vehicle/customer identifier is already registered (step 412), the corresponding profile is recalled from the profile database (step 420). Optionally, the vehicle may be redirected to an AI enabled drive through lane so that a customized menu may be presented to the customer. The profile information is input to the AI computer model along with current context information (step 422). The AI computer model generates a prediction of one or more menu items that are most likely of interest to the customer given the profile information and the current context information, which may include the number and types of other occupants of the vehicle (step 424). The predicted menu items are used along with the preference settings set forth in the profile to generate a customized menu for output to the customer (step 426).

Based on the customized menu, the customer selects one or more menu items through a suitable interface, such as a voice recognition system employing NLP, a mobile device, touch screen input, or the like (step 428). The transaction is then completed through the local computing system payment processing system and the details of the transaction are recorded (step 430). The transaction information is then used to update the profile for the customer (step 432) and the operation terminates.

In view of the above, it can be seen that the illustrative embodiments provide an improved computing tool and improved computing tool functionality/operations that perform artificial intelligence (AI) based drive-through transactions. The method, system, and computer program product, in accordance with one or more illustrative embodiments, automatically capturing, by a digital image capturing device in response to a vehicle entering a drive-through of an establishment, at least one digital image of the vehicle and automatically executing, in response to capturing the at least one digital image, a computer vision operation on the at least one digital image to analyze data patterns in the at least one digital image and identify an identity of at least one individual within the vehicle based on results of the analysis of the data patterns. The method, system and computer program product further operate to automatically retrieve, in response to identifying the at least one individual, at least one user profile, from a user profile registry, corresponding to the determined at least one identity of the at least one individual within the vehicle, automatically generate a customized menu of at least one of products or services based on user profile information stored in the at least one user profile, automatically pre-select one or more menu items from the customized menu based on contextual information derived from at least one of audio or digital image data received during the drive-through transaction; and control a menu presentation computing device located in the drive-through to present the pre-selected one or more menu items and the customized menu to the at least one individual.

In some illustrative embodiments, the drive-through transaction is individually tailored, based on the contextual information derived from at least one of the audio or digital image data, to the at least one individual within the vehicle. Individually tailoring the drive-through transaction includes dynamically altering audio and image based communications generated by an artificial intelligence (AI) interactive agent while communicating with the at least one individual within the vehicle via the menu presentation computing device.

In some illustrative embodiments, automatically retrieving the at least one user profile further comprises retrieving the at least one user profile based on a captured digital image of a computer only readable code presented as a graphic affixed to the vehicle or a vehicle license plate on the vehicle. In some illustrative embodiments, the at least one user profile comprises, for each user profile in the at least one user profile, at least one of a transaction history, user preferences, or contextual information for past transactions.

In some illustrative embodiments, different entries in the at least one user profile are established for different combinations of categories of individuals in the vehicle. In such illustrative embodiments, retrieving the at least one user profile further comprises executing at least one machine learning computer model on the captured at least one digital image and categorizing, by the at least one machine learning computer model, other individuals in the vehicle, other than a driver of the vehicle. Moreover, the retrieving further comprises retrieving an entry from the at least one user profile corresponding to the combination of categories of individuals identified in the vehicle.

In some illustrative embodiments, the automatic pre-selecting of one or more menu items from the customized menu based on contextual information further comprises pre-selecting the one or more menu items based on contextual information specifying a day and time of the drive-through transaction. In such illustrative embodiments different menu items are pre-selected at different days and times.

In some illustrative embodiments, the method, system, or computer program product trains a machine learning computer model on training data comprising historical transaction data and context information for drive-through transactions of a plurality of combinations of individuals present in a plurality of vehicles, to predict a customized listing of goods or services. In such illustrative embodiments, automatically generating a customized menu of at least one of products or services based on user profile information stored in the at least one user profile comprises executing the trained machine learning computer model on the user profile information to predict menu items that are of interest to the at least one individual for the drive-through transaction.

In some illustrative embodiments, controlling a menu presentation computing device located in the drive-through further comprises modifying a presented persona of an AI conversation system of the menu presentation computing device based on the at least one user profile. In some illustrative embodiments, the operation of the illustrative embodiment is executed prior to the vehicle reaching a physical location of an output display of the menu presentation computing device in the drive-through of the establishment.

In some illustrative embodiments, in response to automatically retrieving the at least one user profile, the method, system, or computer program product controls a visual display device at the drive-through to redirect a path of motion of the vehicle along a selected drive-through lane of a plurality of drive-through lanes. In such illustrative embodiments, the selected drive-through lane is a drive-through lane established for executing artificial intelligence (AI) based transactions based on customized menus.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for performing an artificial intelligence (AI) based drive-through transaction, comprising:

automatically capturing, by a digital image capturing device, based on a vehicle entering a drive-through of an establishment, at least one digital image of the vehicle;

automatically executing, based on the capturing of the at least one digital image, a computer vision operation on the at least one digital image to:

analyze data patterns in the at least one digital image; and identify an identity of each of a plurality of occupants within the vehicle based on results of the analysis of the data patterns;

automatically retrieving, based on the to identifying of the identity of each of the plurality of occupants, an entry of at least one user profile, from a user profile registry, wherein the retrieved entry corresponds to a combination of the plurality of occupants within the vehicle, and the retrieved entry includes historical transaction data of the combination of the plurality of occupants;

automatically generating a customized menu of at least one of products or services based on the historical transaction data of the combination of the plurality of occupants;

automatically pre-selecting one or more menu items from the customized menu based on contextual information derived from at least one of audio or digital image data received during the AI based drive-through transaction; and controlling a menu presentation computing device located in the drive-through to present the pre-selected one or more menu items and the customized menu to the plurality of occupants.

2. The computer-implemented method of claim 1, further comprising individually tailoring, based on the contextual information derived from the at least one of the audio or the digital image data, the AI based drive-through transaction to each of the plurality of occupants within the vehicle, wherein the individually tailoring of the AI based drive-through transaction includes:

dynamically altering audio and image based communications generated by an AI interactive agent while communicating with the plurality of occupants within the vehicle via the menu presentation computing device.

3. The computer-implemented method of claim 1, wherein the automatically retrieving of the at least one user profile comprises:

retrieving the at least one user profile based on a captured digital image of a computer only readable code presented as a graphic affixed to the vehicle or a vehicle license plate on the vehicle.

4. The computer-implemented method of claim 1, wherein different entries in the at least one user profile are established for different combinations of categories of occupants in the vehicle, and wherein the retrieving of the entry of the at least one user profile further comprises:

executing at least one machine learning computer model on the captured at least one digital image; and categorizing, by the at least one machine learning computer model, other occupants of the plurality of occupants in the vehicle, other than a driver of the vehicle.

5. The computer-implemented method of claim 1, wherein the entry of the at least one user profile further comprises, for each user profile in the at least one user profile, at least one of user preferences or contextual information for past transactions.

6. The computer-implemented method of claim 1, wherein the automatically pre-selecting of the one or more menu items from the customized menu based on the contextual information further comprises;

pre-selecting the one or more menu items based on the contextual information specifying a day and time of the AI based drive-through transaction, wherein different menu items are pre-selected at different days and times.

7. The computer-implemented method of claim 1, further comprising training a machine learning computer model on training data comprising the historical transaction data and context information for drive-through transactions of a plurality of combinations of occupants present in a plurality of vehicles, to predict a customized listing of goods or services, wherein the automatically generating of the customized menu of the at least one of the products or the services comprises:

executing the trained machine learning computer model, on user profile information stored in the at least one user profile, to predict the one or more menu items that are of interest to the plurality of occupants for the AI based drive-through transaction.

8. The computer-implemented method of claim 1, wherein the controlling of the menu presentation computing device located in the drive-through further comprises:

modifying a presented persona of an AI conversation system of the menu presentation computing device based on the at least one user profile.

9. The computer-implemented method of claim 1, further comprising, based on the automatically retrieving of the entry of the at least one user profile, controlling a visual display device at the drive-through to redirect a path of motion of the vehicle along a selected drive-through lane of a plurality of drive-through lanes, wherein the selected drive-through lane is a drive-through lane established for executing artificial intelligence (AI) based transactions based on customized menus.

10. The computer-implemented method of claim 1, wherein the computer-implemented method is executed prior to the vehicle reaching a physical location of an output display of the menu presentation computing device in the drive-through of the establishment.

11. A computer program product comprising a computer readable storage medium having a computer readable program stored therein, wherein the computer readable program, when executed on a computing device, causes the computing device to perform an artificial intelligence (AI) based drive-through transaction at least by:

automatically capturing, by a digital image capturing device, based on a vehicle entering a drive-through of an establishment, at least one digital image of the vehicle;

automatically executing, based on the capturing of the at least one digital image, a computer vision operation on the at least one digital image to:

analyze data patterns in the at least one digital image; and identify an identity of each of a plurality of occupants within the vehicle based on results of the analysis of the data patterns;

automatically retrieving, based on the identifying of the identity of each of the plurality of occupants, an entry of at least one user profile, from a user profile registry, wherein the retrieved entry corresponds to a combination of the plurality of occupants within the vehicle, and the retrieved entry includes historical transaction data of the combination of the plurality of occupants;

automatically generating a customized menu of at least one of products or services based on the historical transaction data of the combination of the plurality of occupants;

automatically pre-selecting one or more menu items from the customized menu based on contextual information derived from at least one of audio or digital image data received during the AI based drive-through transaction; and controlling a menu presentation computing device located in the drive-through to present the pre-selected one or more menu items and the customized menu to the plurality of occupants.

12. The computer program product of claim 11, wherein the computer program product further causes the computing device to individually tailor, based on the contextual information derived from the at least one of the audio or the digital image data, the AI based drive-through transaction to each of the plurality of occupants within the vehicle, wherein the individually tailoring of the AI based drive-through transaction includes:

dynamically altering audio and image based communications generated by an AI interactive agent while communicating with the plurality of occupants within the vehicle via the menu presentation computing device.

13. The computer program product of claim 11, wherein the automatically retrieving of the at least one user profile comprises:

retrieving the at least one user profile based on a captured digital image of a computer only readable code presented as a graphic affixed to the vehicle or a vehicle license plate on the vehicle.

14. The computer program product of claim 11, wherein different entries in the at least one user profile are established for different combinations of categories of occupants in the vehicle, and wherein the retrieving of the entry of the at least one user profile further comprises:

executing at least one machine learning computer model on the captured at least one digital image; and categorizing, by the at least one machine learning computer model, other occupants of the plurality of occupants in the vehicle, other than a driver of the vehicle.

15. The computer program product of claim 11, wherein the entry of the at least one user profile further comprises, for each user profile in the at least one user profile, at least one of user preferences or contextual information for past transactions.

16. The computer program product of claim 11, wherein the automatically pre-selecting of the one or more menu items from the customized menu based on the contextual information further comprises:

pre-selecting the one or more menu items based on the contextual information specifying a day and time of the AI based drive-through transaction, wherein different menu items are pre-selected at different days and times.

17. The computer program product of claim 11, wherein the computer program product further causes the computing device to train a machine learning computer model on training data comprising the historical transaction data and context information for drive-through transactions of a plurality of combinations of occupants present in a plurality of vehicles, to predict a customized listing of goods or services, wherein the automatically generating of the customized menu of the at least one of the products or the services comprises;

executing the trained machine learning computer model on user profile information stored in the at least one user profile, to predict the one or more menu items that are of interest to the plurality of occupants for the AI based drive-through transaction.

18. The computer program product of claim 11, wherein the controlling of the menu presentation computing device located in the drive-through further comprises:

modifying a presented persona of an AI conversation system of the menu presentation computing device based on the at least one user profile.

19. The computer program product of claim 11, wherein the computer program product further causes the computing device to control, based on the automatically retrieving of the entry of the at least one user profile, a visual display device at the drive-through to redirect a path of motion of the vehicle along a selected drive-through lane of a plurality of drive-through lanes, wherein the selected drive-through lane is a drive-through lane established for executing artificial intelligence (AI) based transactions based on customized menus.

20. An apparatus comprising:

at least one processor; and at least one memory coupled to the at least one processor, wherein the at least one memory comprises instructions which, when executed by the at least one processor, cause the at least one processor to perform an artificial intelligence (AI) based drive-through transaction at least by:

automatically capturing, by a digital image capturing device, based on a vehicle entering a drive-through of an establishment, at least one digital image of the vehicle;

automatically executing, based on the capturing of the at least one digital image, a computer vision operation on the at least one digital image to:

analyze data patterns in the at least one digital image; and identify an identity of each of a plurality of occupants within the vehicle based on results of the analysis of the data patterns;

automatically retrieving, based on the identifying of the identity of each of the plurality of occupants, an entry of at least one user profile, from a user profile registry, wherein the retrieved entry corresponds to a combination of the plurality of occupants within the vehicle, and the retrieved entry includes historical transaction data of the combination of the plurality of occupants;

automatically generating a customized menu of at least one of products or services based on the historical transaction data of the combination of the plurality of occupants;

automatically pre-selecting one or more menu items from the customized menu based on contextual information derived from at least one of audio or digital image data received during the AI based drive-through transaction; and controlling a menu presentation computing device located in the drive-through to present the pre-selected one or more menu items and the customized menu to the plurality of occupants.

* * * * *